United States Patent Office 3,079,300
Patented Feb. 26, 1963

3,079,300
PHLOROPHENONE DERIVATIVES FOR HEPATIC AND NEPHRITIC COLIC
Louis Lafon, Paris, France, assignor to Societe Anonyme dite: Orsymonde, Paris, France, a French company
No Drawing. Filed Aug. 31, 1961, Ser. No. 135,158
Claims priority, application Great Britain Sept. 21, 1960
5 Claims. (Cl. 167—65)

The present invention relates to alkylated derivatives of phlorophenone which correspond to the following formula:

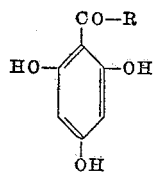

in which R represents an alkyl radical.

These compounds have interesting properties in therapeutics and can be utilised as antispasmodics and hypotensives.

In particular, the applicant has prepared trihydroxy-2,4,6-isobutyrophenone having the following formula:

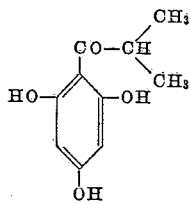

For this purpose, two moles of isobutyronitrile (138 g.) were reacted with one mole of previously dried phloroglucinol (126 g.); the two reactants were dissolved in anhydrous ether and 25 g. of zinc chloride were added.

A stream of hydrogen chloride was passed into the reaction medium for two hours and it was then allowed to stand for 24 hours in the refrigerator. A stream of hydrogen chloride was thereafter passed in for 2 to 3 hours and the appearance of an orange precipitate was observed. The reaction medium was allowed to stand for 3 days in the refrigerator. The supernatant ether was decanted and the precipitate was washed twice by means of anhydrous ether.

The precipitate was taken up in about 1 litre of boiling water and the solution was maintained at the boiling point under reflux for 2 hours.

After standing for 10 hours, the medium was filtered on a vacuum filter and yellow orange needles were obtained. The product was purified twice by dissolution in boiling water and precipitation in the cold and finally 120 g. of a product were obtained, namely a yield of 60%.

The product had a molecular weight of 194. Its melting point (anhydrous) is 138° C.; it is relatively soluble in ether, alcohol and hot water and insoluble in cold water.

Proceeding in the same manner as described above, an isomer of the above-described derivative can be obtained, namely trihydroxy-2,4,6-butyrophenone, corresponding to the formula:

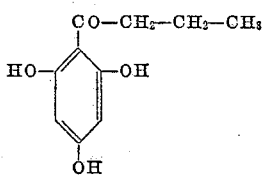

This compound has a melting point of 180° C.; it is very slightly soluble in hot water and insoluble in cold water. It is very slightly soluble in ether and slightly soluble in alcohol.

The differences of the melting points and solubilities of these two isomers allow them to be separated very readily.

The applicant has also shown the interesting properties of trihydroxy-2,4,6-propiophenone, corresponds to the to the general formula given above in which the radical R represents —$CH_2$—$CH_3$.

The toxicity of this compound has been studied in female mice of the Webster strain having weights ranging from 16 to 25 g., the animals being maintained throughout the whole of the observation in individual cages. The intraperitoneal toxicity was determined by administering doses between 0.125 and 1 g./kg. to 24 animals. The average toxic dose determined by the graphic method of Miller and Tainter is 0.37 g./kg.; the limits of toxicity in 19 out of 20 cases are 0.22 and 0.58 g./kg.

The gastric toxicity was also determined on 32 mice and it was observed after 10 days that the average mortal dose is 1.10 g./kg.

The effect of the product on isolated organs has also been studied and in particular on rat duodenum maintained alive by immersion in oxygenated Tyrode liquid at a temperature of +32° C. Doses of the product of 1 to 2 mg. per 80 cc. of Tyrode liquid were utilised; these doses allowed alleviation of the spasm produced by barium chloride (3 mg. in 80 cc. of Tyrode liquid); this effect is reversible by washing, the intestine continuing to respond to the spasmogenic effect of barium chloride and not becoming intoxicated. It was observed that the antispasmodic effect of the product appears to be proportional to the dose utilised.

It has also been observed that the effect of 0.1 cc. of acetylcholine on rat duodenum is inhibited by 5 mg./kg. of the product.

The effect of the product on isolated guinea pig ureter, maintained alive in Ringer Locke liquid at a temperature of +37° C., has also been studied.

Barium chloride exerts on isolated guinea pig ureter an increase in the rhythm and amplitude of the pendular movements. The product permits the action of barium chloride to be inhibited, even in a dose of 0.1 mg. per cc. of Ringer Locke liquid.

Also, the effect of the product on the coronary output of perfused isolated rabbit heart has been studied according to the method of Langendorff. After having established the base perfusion output, a dilute solution of the product was injected into the rubber tube which connects the perfusion device to the canulla. The coronary output was recorded with precision and variations due to the action of the product were then determined.

A comparison with papaverine hydrochloride was carried out on three rabbit hearts and it was thus observed that a dose of 1 mg. injected into the rubber connecting the canulla to the perfusion device exerts a clear dilative effect.

The cardio-vascular effect of the product was studied on dogs normo-tensively anaesthetised with chloralose. Doses of 5 to 100 mg./kg. were used, injected into mongrel dogs of either sex weighing between 8 and 22 kg.

With the exception of the 5 mg./kg. dose, all the doses used caused a very marked hypotensive action which lasted for 10 to 20 minutes.

In other dogs, the respiratory effect of the product was studied and it was observed that a dose of 100 mg./kg. injected intravenously increases the respiratory amplitude and rhythm.

The antispasmodic action was also studied in situ on 4 dogs anaesthetised with chloralose and subjected to artificial respiration; the peristaltic movements were recorded by the standard method using a balloon connected to a Marey capsule.

It was observed that a dose of 40 mg./kg. was already slightly antispasmodic; doses of 45 to 60 mg./kg. injected intravenously inhibited the spasmodic effect of 3 mg. of barium chloride also injected intravenously.

It was also observed that such doses permit diminution of the action of 5 mg./kg. of β-methylacetylcholine chloride.

Finally, the action of the product of choleresis was studied.

Catheterisation of the choledochal duct was effected in dogs anaesthetised with pentobarbital; the cystic duct which eliminates vesicular bile was ligatured and the choledochal duct was catheterised by means of a probe connected outside after suture to the abdominal wall in the subcutaneous region.

The animal received daily 50 cc. of beef bile added to a rich paste of chopped meat; the physiological test was effected after the end of one to two weeks.

The base choleresis was determined by measuring the volume of bile eliminated every ¼ hour until it became constant and the product was then injected intravenously in doses of 2 to 10 mg./kg.

It was observed that in most cases the dose of 2 mg./kg. clearly diminished the choleresis, after a slight temporary increase; on the other hand, doses of 5 to 10 mg./kg. caused an increase in choleresis.

Also, on three dogs having acute fistula, anaesthetised with chloralose, the effect of the product was recorded graphically by means of an electric drop-counter.

It was observed as before that a dose of 2 mg./kg. diminished choleresis and that higher doses caused a slight increase in choleresis.

The anti-serotonin action of the product was finally investigated on isolated rat uterus in oestrus. The uterus was maintained alive by the method of Gaddum and it was shown that the product in an average dose of 100 gammas for a bath of 60 cc. stopped or diminished the contraction caused by serotonin (in a dose varying from $\frac{1}{10}$ gamma to $\frac{9}{10}$ gamma in 60 cc.).

Clinical tests effected at the Neckar Hospital in Paris allowed it to be shown that cachets of phloropropiophenone, containing 10 to 50 mg. of the product, were extremely effective in the treatment of hepatic and nephritic colitis.

The following compositions were prepared:

Phloropropiophenone _____ 0.02 to 0.05
Glucose _____ 0.10 to 0.50
Excipient, q.s. for a cachet, capsule, tablet or suppository.

The properties of trihydroxyacetophenone, which corresponds to the formula given in which R represents the methyl radical, were also demonstrated.

This compound has the form of a very pale yellow orange powder, which is very friable and without odour and melts at 216° C.; it is very soluble in alcohol and acetone, soluble in hot water and slightly soluble in cold water, slightly soluble in ether and ethyl acetate and insoluble in benzene and chloroform.

In the first place, the toxicity of the compound was determined.

The acute toxicity was determined intraperitoneally in mice.

Experiments were carried out on 32 female mice of the Webster strain of weights ranging from 16 to 25 g., which had received doses increasing from 0.200 to 0.800 g./kg. body weight. The product was administered in aqueous suspension.

The animals were maintained throughout the whole duration of the observation in individual cages.

The DL 50 value was determined by the graphic method of Miller and Tainter; it is 0.656 g./kg.

Also, the limits of toxicity in 19/20 of the cases were determined utilising the method of Litchfield and Wilcoxon; they appear to vary between 0.496 and 0.856 g./kg. body weight.

The pharmacodynamic spectrum of the compound was then established.

The effect of the compound on isolated organs has been studied.

On rat duodena, the method of Magnus was utilised. Tests were carried out by envisaging the musculotropic and neurotropic antispasmodic activity. The musculotropic activity was studied utilising barium as the spasmogenic agent.

Tests were effected on 6 different organs. The compound exerts a musculotropic antispasmodic action 50 times greater than that of the atomisate of lime sapwood described by the applicant in application No. 25,388/59.

The neurotropic effect has been studied on isolated rat duodenum utilising acetylcholine as the spasmogenic agent, the reference sample being atropine sulphate.

In a dose of 0.08 mg./cc., the compound diminishes or prevents the spasm produced by 0.17 gamma per cc. of acetylcholine. It appears that the compound is 1850 times less active than atropine sulphate.

On isolated guinea-pig ureter, a method of survival was utilised employing Locke liquid which was especially deprived of phosphates and magnesium salts and maintained at a temperature of 37° C. Barium chloride was used as the spasmogenic agent.

Barium chloride in a dose of 0.05 mg./cc. increases the rhythm and amplitude of the automatic pendular movements. After washing, the effect of the barium chloride is arrested by 0.10 mg./cc. of the compound.

The compound has been studied for its modifying effect on coronary output; the method of perfusion of the rabbit heart according to the method of Langendorff was utilised.

An improvement in the method was made:
(1) By substituting a solution of Van Dyke and Hastings liquid for the Ringer liquid;
(2) By producing vasoconstriction by perfusion with the aid of a solution of barium chloride at a concentration of $1.5 \times 10^{-4}$. As a reference sample, papaverine hydrochloride in a concentration of $1.5 \times 10^{-4}$ was utilised.

The compound in solution at a concentration of $1.0 \times 10^{-4}$ exerts a very clear vasodilatory action (203%). This is at least 20 times less than that of papaverine.

A barium solution in a concentration of $1.5 \times 10^{-4}$ produced a vasodilation of 132%. On the same organ after washing, a solution of barium chloride containing papaverine in a concentration of $5 \times 10^{-6}$ produced a vasodilation of 132%. Then, on the same organ after washing, a solution of barium chloride containing the compound in a concentration of $1.0 \times 10^{-4}$ produced a vasodilation of 203%.

The effect of the compound on organs of the dog in situ has also been studied.

The vascular effect has been examined in a dog normotensively anaesthetised with chloralose. The carotid pressure was recorded by the standard method using a Ludwig manometer. The experiment was carried out on 6 mongrel dogs of either sex with weights ranging between 4 and 17 kg.

The compound was injected in doses ranging between 5 and 200 mg./kg. Doses of 5, 10 and 50 mg./kg. were without effect on the pressure. It was necessary to inject doses of 100 to 200 mg./kg. to observe any drop in pressure.

On the dogs mentioned above, the respiratory amplitude was also recorded by connecting a tracheal canulla to a Marey capsule.

No effect was noted until attaining a dose of 100 mg./kg. administered intravenously, which increases the respiratory amplitude and rhythm.

The action on duodenal peristalsis in the dog anaesthetised with chloralose was studied by the method of a balloon inserted in the duodenum and connected to a Marey capsule.

Even at doses below 50 mg./kg., it was noted that the peristalsis was clearly diminished. A dose of 50 mg./kg. injected intravenously retarded the peristalsis for a duration of 6 minutes. At a dose of 100 mg./kg., it was necessary to wait 45 minutes for recovery of the normal peristaltic activity.

The antispasmodic action in situ was studied, likewise in a dog anaesthetised with chloralose and subjected to artificial respiration, the peristaltic movements also being recorded by the balloon method. As the spasmogenic agent, mecholyl was utilised which was injected in a dose of 15 gamma/kg. The compound in a dose of 100 mg./kg. considerably diminished the effect of the spasm produced by this agent when injected 7 minutes previously.

The effect of the compound on the biliary flux was also studied.

This was determined on dogs with acute choledochal fistula anaesthetised with chloralose.

After ligature of the cystic duct, the choledochal duct was fistulised by means of a polyethylene canulla. When the choleresis had been stabilised 2 hours after administration of the chloralose, the biliary flux was recorded by means of an electric drop-counter. Also the bile was recovered in a graduated cylinder and the volume determined every 15 minutes.

The results obtained on 2 dogs allowed it to be established that, even in a dose of 5 mg./kg., the compound clearly increases the choleresis. The effect is substantially proportional to the dose, increase in the biliary flux being prolonged for more than one hour.

The modifying action of the compound with respect to peripheral poisons has also been studied.

Adrenalin and acetylcholine were used for this purpose, the effects of which on the pressure in a normotensive dog have been recorded. The hypertensive effect of adrenalin is not modified by the compound, even by intravenous injection in a dose of 100 mg./kg. Only the bradycarbic reflex is diminished. Also, the hypotensive effect of acetylcholine is diminished by the administration of a dose of 100 mg./kg. The effect of acetylcholine on the peristalsis is clearly diminished.

It was also observed that the compound causes potentialisation of the hypnotic effect of hexobarbital.

In mice, a dose of 50 mg./kg. of hexobarbital administered intraperitoneally produced sedation lasting for 41 minutes on average. Administration of the compound given 30 minutes before in the same dose of hexobarbital produced sedation for 84 minutes.

It was also observed that the compound, administered buccally in a dose of 500 mg./kg., clearly lowers the temperature of the mice, which is 38.2° C. before administration of the product, drops to 32.5° C. after 2 hours and to 29.8° C. after 6 hours. Control animals on the other hand had a temperature which remained constant between 37° and 37.5° C. Chlorpromazine in a dose of 2 mg./kg. administratered subcutaneously produced a drop in temperature of the same order as that of the compound.

Trihydroxyacetophenone, like phloropropiophenone, diminishes the action of serotonin; for example, 10 gammas in a bath of 60 cc. diminishes by 65% the contraction caused by 1 gamma of serotonin in 60 cc.

Pharmaceutical compositions containing trihydroxyacetophenone and a carrier have been prepared, which can be used as antispasmodics and in the treatment of mental illnesses and nephritic colic.

It has been discovered that trihydroxyacetophenone can become a solute in the following conditions:

Trihydroxyacetophenone _____ 10 g.
NaOH _____ 3 g.
Distilled water, q.s. for 100 cc.

The quantities of alkali necessary to obtain a limpid solution are slightly greater than those calculated presuming saponification of a single phenol group. The solutions are stable and can be diluted with water. More concentrated solutions can be obtained by utilising corresponding quantities of alkaline solution of higher titre.

Trihydroxyacetophenone _____ 10 g.
Monoethanolamine _____ 4.5 g.
Distilled water, q.s., 100 cc.

Trihydroxyacetophenone _____ 10 g.
Diethanolamine _____ 7 g.
Distilled water, q.s., 100 cc.

The two latter solutions can also be diluted and are stable.

The following compositions have been prepared,

Trihydroxyacetophenone _____ 0.03 to 0.10 g.
Glucose _____ 0.10 to 0.40 g.
Excipient, q.s., for a cachet, capsule, tablet or suppository.

Trihydroxacetophenone _____ 0.005 to 0.10 g.
Monoethanolamine _____ 0.0025 to 0.0045 g.
Distilled water, 1 cc. for an ampoule.

Clinical tests have been carried out with cachets having the above formula and it has been found that on 15 patients having hepatic colic, the daily absorption of 2 to 5 cachets eliminated melancholic crises and migraines in a very complete and rapid manner.

Other compositions have also been prepared which have been found particularly effective:

Trihydroxyisobutyrophenone _____ 0.05 g.
Glucose _____ 0.05 g.
Excipient q.s., for a cachet, capsule, tablet or suppository.

Trihydroxy-2,4,6-butyrophenone _____ 0.02 g.
Glucose _____ 0.10 g.
Excipient q.s., for a cachet, capsule, tablet or suppository.

Phloropropiophenone _____ 0.02 g.
Trihydroxyacetophenone _____ 0.02 g.
Glucose _____ 0.10 g.
Excipient, q.s., for a cachet, capsule, tablet or suppository.

Phloropropiophenone _____ 0.01 g.
Trihydroxyacetophenone _____ 0.01 g.
Trihydroxyisobutyrophenone _____ 0.01 g.
Trihydroxybutyrophenone _____ 0.01 g.
Excipient, q.s., for a cachet, capsule, tablet or suppository.

Clinical tests effected with trihydroxyacetophenone and phloropropiophenone have confirmed the properties summarised above and show that these products give excellent results in the treatment of hepatic colic, digestive migraines and the digestive disorders of hepatic sufferers.

I claim:

1. A pharmaceutical composition in daily unit dosage form for the treatment of hepatic and nephritic colic, each dosage unit of which comprises a phlorophenone derivative selected from the group consisting of trihydroxy-2,4,6-propiophenone, trihydroxy-2,4,6-butyrophenone, trihydroxy-2,4,6-isobutyrophenone and trihydroxy-2,4,6-acetophenone in an amount of 0.01 to 0.10 gram, a dissolving agent selected from the group consisting of sodium hydroxide, monoethanolamine and diethanolamine and a pharmaceutical carrier therefor.

2. A method of treatment of hepatic and nephritic colic, consisting in administering trihydroxy-2,4,6-isobutyrophenone in an amount of 0.01 to 0.10 g. per day.

3. A method of treatment of hepatic and nephritic colic, consisting in administering trihydroxy-2,4,6-butyrophenone in an amount of 0.01 to 0.10 g. per day.

4. A method of treatment of hepatic and nephritic colic, consisting in administering trihydroxy-2,4,6-propiophenone in an amount of 0.01 to 0.10 g. per day.

5. A method of treatment of hepatic and nephritic colic, consisting in administering trihydroxy-2,4,6-acetophenone in an amount of 0.01 to 0.10 g. per day.

References Cited in the file of this patent

UNITED STATES PATENTS

| | | |
|---|---|---|
| 2,907,794 | Boehme | Oct. 6, 1959 |
| 2,923,739 | Pollitzer | Feb. 2, 1960 |
| 2,925,364 | Bechtol | Feb. 16, 1960 |
| 2,953,493 | Schroeder | Sept. 20, 1960 |

OTHER REFERENCES

British: C.A., vol. 46, page 4751(c), 1952.
Seelkopf: C.A., vol. 47, page 7455(e), 1953.
Haley: C.A., vol. 49, page 7675(d), 1955.
Inagaki: C.A., vol. 50, page 9607(g), 1956.
German: C.A., vol. 53, page 10674(h), 1959.